United States Patent
Zinner

(10) Patent No.: US 11,019,102 B2
(45) Date of Patent: May 25, 2021

(54) METHOD FOR A COMMUNICATION NETWORK, AND ELECTRONIC MONITORING UNIT

(71) Applicant: Continental Automotive GmbH, Hannover (DE)

(72) Inventor: Helge Zinner, Regensburg (DE)

(73) Assignee: Continental Automovie Gmbh

( * ) Notice: Subject to any disclaimer, the term of this patent is extended or adjusted under 35 U.S.C. 154(b) by 0 days.

(21) Appl. No.: 16/344,528

(22) PCT Filed: Nov. 17, 2017

(86) PCT No.: PCT/EP2017/079584
§ 371 (c)(1),
(2) Date: Apr. 24, 2019

(87) PCT Pub. No.: WO2018/099736
PCT Pub. Date: Jun. 7, 2018

(65) Prior Publication Data
US 2019/0245890 A1  Aug. 8, 2019

(30) Foreign Application Priority Data

Nov. 18, 2016  (DE) ...................... 10 2016 222 740.8

(51) Int. Cl.
*H04L 29/06* (2006.01)
*H04L 29/08* (2006.01)
(52) U.S. Cl.
CPC .......... *H04L 63/20* (2013.01); *H04L 63/0209* (2013.01); *H04L 63/1408* (2013.01);
(Continued)

(58) Field of Classification Search
CPC . H04L 63/20; H04L 63/0209; H04L 63/1408; H04L 63/0245; H04L 67/10;
(Continued)

(56) References Cited

U.S. PATENT DOCUMENTS 6,161,071 A    12/2000   Shuman et al.
8,914,406 B1   12/2014   Haugsnes et al.
(Continued)

FOREIGN PATENT DOCUMENTS

CN    1666477 A     9/2005
CN    101300807 A   11/2008
(Continued)

OTHER PUBLICATIONS

Anonymous: Distributed Firewall—Wikipedia, Apr. 20, 2016, retrieved fro the internet: https://en.wikipedia.org/wiki/Distributed_firewall—8 pages.
(Continued)

*Primary Examiner* — Joseph P Hirl
*Assistant Examiner* — Chi D Nguy
(74) *Attorney, Agent, or Firm* — RatnerPrestia

(57) ABSTRACT

A method for a communication network in a motor vehicle, wherein a communication in the communication network involves a data transmission being performed and the communication network has provision for at least two communication subscribers. Also, disclosed is an electronic monitoring unit for a motor vehicle control device.

9 Claims, 5 Drawing Sheets

(52) U.S. Cl.
CPC .............. *H04L 67/10* (2013.01); *H04L 67/12* (2013.01); *H04L 63/0245* (2013.01)

(58) Field of Classification Search
CPC ..... H04L 67/12; H04L 63/14; H04L 63/1441; H04L 63/145; H04L 63/16; H04L 63/162; H04L 63/164; H04L 63/166; H04L 63/168; H04L 63/205
See application file for complete search history.

(56) References Cited

U.S. PATENT DOCUMENTS

| | | |
|---|---|---|
| 2005/0246447 A1 | 11/2005 | Smidt et al. |
| 2009/0222904 A1 | 9/2009 | Schmidtke |
| 2014/0185463 A1 | 7/2014 | Likkei |
| 2014/0351918 A1* | 11/2014 | Crawford ............ H04L 63/0236 726/12 |
| 2015/0089236 A1* | 3/2015 | Han ...................... H04L 9/3242 713/181 |
| 2015/0191136 A1 | 7/2015 | Ben Noon et al. |
| 2018/0183826 A1* | 6/2018 | Demi .................. H04L 63/1433 |
| 2018/0205703 A1* | 7/2018 | Grau .................. H04L 63/1441 |

FOREIGN PATENT DOCUMENTS

| | | |
|---|---|---|
| CN | 103139184 A | 6/2013 |
| CN | 104908781 A | 9/2015 |
| EP | 2892199 A1 | 7/2015 |
| JP | 2000293493 A | 10/2000 |
| JP | 2000330897 A | 11/2000 |
| JP | 2004318742 A | 11/2004 |
| JP | 2006240610 A | 9/2006 |
| JP | 2014520441 A | 8/2014 |
| JP | 2015136107 A | 7/2015 |
| KR | 20150073176 A | 6/2015 |
| WO | 2014061021 A1 | 4/2014 |

OTHER PUBLICATIONS

Anonymous: Firewall (Computing)—Wikipedia, Nov. 9, 2016, retrieved fro the internet: https://en.wikipedia.org/wiki/Firewall_(computing)—8 pages.
Anonymous: Network Switch—Wikipedia, Nov. 14, 2016, retrieved from internet: https://en.wikipedia.org/wiki/Network_switch—10 pages 2019.
International Search Report and Written Opinion for International Application No. PCT/EP2017/079584, dated Jan. 26, 2018—9 pages.
Chinese Office Action for Chinese Application No. 201780066155.7, dated Dec. 3, 2020, 8 pages.
Japanese Decision to Grant a Patent for Japanese Application No. 2019-526253, dated Sep. 30, 2020, with translation, 5 pages.
Korean Notice of Grounds for Rejection for Korean Application No. 10-2019-7014363, dated Aug. 24, 2020, with translation, 8 pages.
Inada, T., et al., "Development of dispersion placed type security device", Proceedings of the 2005 IEICE General Conference, The Institute of Electronics, Information & Communication Engineers, Osaka University, Toyonaka Campus, Toyonaka, Mar. 21-24, 2005, 4 pages.
Japanese Office Action for Japanese Application No. 2019-526259, dated Jun. 24, 2020, 5 pages.
Onuki et al., "Development of Dispersion Placed Type Security Device", Proceedings of the 2005 Ieice Generakl Conference, 2005, 4 pages.

* cited by examiner

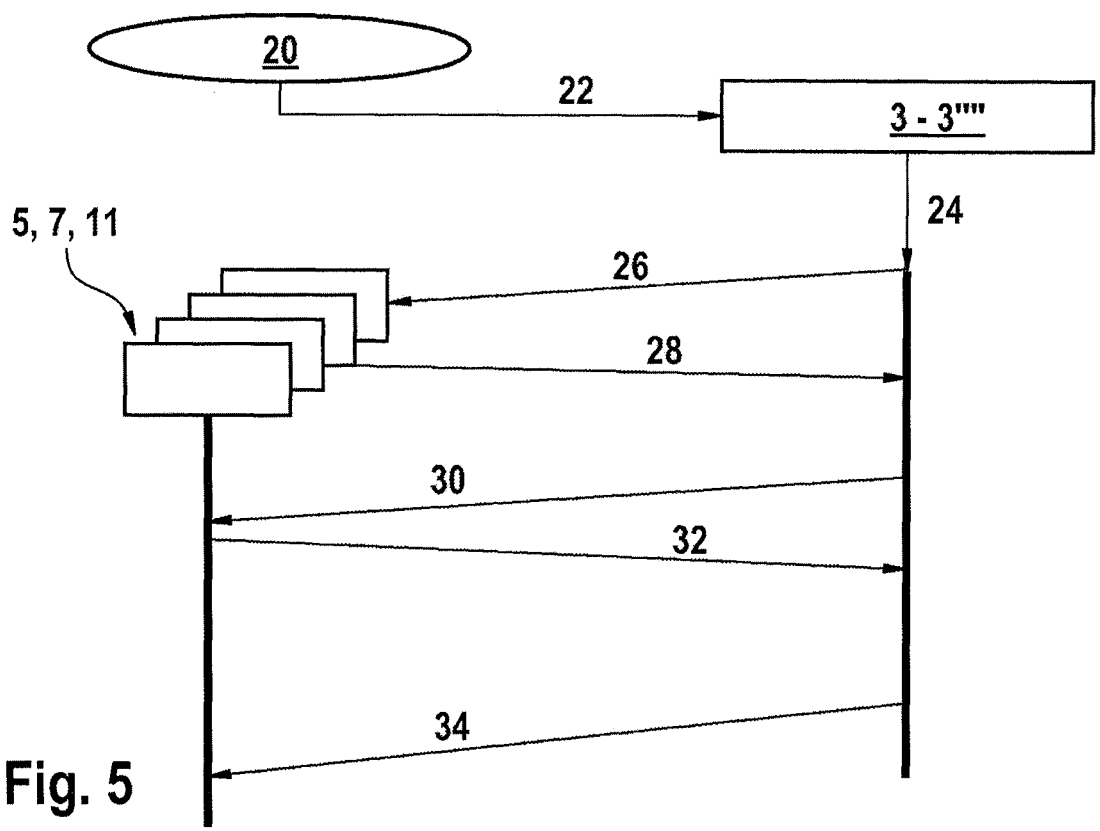

Fig. 5

| Attack | ECU 1 | ECU 2 incl. Switch | ... | Full Firewall |
|---|---|---|---|---|
| DoS Attack | Not possible | Assisted | ... | Completely covered |
| VLAN | Not possible | Completely covered | ... | Limited possibility |
| Layer 2 QoS | Not possible | Completely covered | ... | Limited possibility |
| TOS | Not possible | Completely covered | ... | Completely covered |
| Packet size | Not possible | Completely covered | ... | Limited possibility |
| Frequency | Not possible | Completely covered | ... | Limited possibility |
| Syn- Flooding | Not possible | Not possible | ... | Completely covered |
| Smurf attack | Not possible | Not possible | ... | Completely covered |

Fig. 6

METHOD FOR A COMMUNICATION NETWORK, AND ELECTRONIC MONITORING UNIT

CROSS REFERENCE TO RELATED APPLICATIONS

This application is the U.S. National Phase application of PCT International application No. PCT/EP2017/079584, filed Nov. 17, 2017, which claims priority to German Patent Application No. 10 2016 222 740.8, filed Nov. 18, 2016, the contents of such applications being incorporated by reference herein.

FIELD OF THE INVENTION

The present invention relates to a method for a communication network and to an electronic monitoring unit.

BACKGROUND OF THE INVENTION

On the basis of the Ethernet physical layer and the Internet protocol (IP) above it, techniques which are already widespread within the scope of information technology systems are finding their way into communication networks of vehicles. In view of an increasing use of the Ethernet and Internet protocols in particular, there is a need for further security mechanisms in order to be able to prevent external access. On account of increasing use of radio technologies and associated open and standardized protocols, it is therefore possible substantially for the first time in the automotive sector to access the communication networks of a vehicle by remote access. Access to vehicles, during which attackers have managed to gain access to a vehicle via radio and therefore to influence important vehicle functions, has been known, for example. Other industrial sectors have problems and solutions which cannot be applied to automobiles since, for example in the case of a workstation computer, a firewall already operates with data which are already present in the system and not on-the-fly, as required for vehicles. In addition, the security software of workstation computers can be updated in a considerably easier manner than software in automobiles.

A communication packet according to the prior art usually comprises headers of superordinate layers of a protocol stack of a transmitting device. A protocol stack of a receiving device will proceed gradually when receiving this communication packet and will examine it by means of predefined filters in order to forward the transmitted data to a corresponding software application, for example. A communication packet, such as an Ethernet message, runs through a TCP/IP stack, for example, in a control device and is forwarded to the corresponding application on the basis of the analysis of the content.

The complexity of protocol stacks increases considerably with the number of protocols used. For example, Audio/Video Bridging (AVB) for transmitting and reproducing audio and video data comprises four sub-protocols, and Time-Sensitive Networking (TSN) even comprises 11 sub-protocols and comprehensive specifications. The disadvantage of this is that there is thus no simple traceability for a deterministic protocol stack since, on account of the multiplicity of protocols used, there is a very large number of branching possibilities which cannot be easily represented. Therefore, there are considerable problems with determining existing security gaps in a protocol stack. The question is, for example, how to proceed if a new Ethernet type is intentionally or unintentionally used, which would be forwarded to the central computing unit in the event of doubt, which could cause a critical system state and could considerably restrict the functionality of an underlying system and could endanger the safety of road users. Such deliberate unauthorized access could take place, using security gaps which have previously not been found, by means of a denial-of-service attack (DoS), which deliberately searches for security gaps in a protocol stack.

According to the OSI model, data packets can have seven layers. In this case, the data packet is made up of the useful data and a header for each of the layers. Each of the headers stores processing information for the associated layer. The layers therefore each contain the useful data, their own header and the headers of the layers beneath. The layers are reliant in this case on correct processing of the layer beneath and take advantage of the work thereof. The third layer forms for example what is known as the "IP layer", which contains the IP addresses of the sender and the receiver.

Attacks on communication networks can be in very diverse form. The attacks can attack individual layers in this case and take advantage of access to the information obtained there. By way of example, initially what is known as "sniffing" on the second layer can ascertain the IP address of the subscribers, and then what is known as "spoofing" can change the MAC tables of the service users, so that requests to the service provider are no longer transmitted correctly. This then results in what is known as a "denial of service attack" (DoS), which limits the availability of services and/or resources. An attack on higher layers is not at all necessary for this.

In order to detect all attacks in good time, however, not only the headers of lower layers but also the higher layers and the useful data should be searched for possible errors or alterations. Also, a deep analysis of the layers is useful. The deeper an analysis is performed on individual layers, the more bytes of the layer need to be searched and the more errors or potential attacks can be found. The combination of the maximum possible layer to be analysed and the maximum searchable bytes of a layer can be referred to as the "search depth". A search of data in their entirety (headers of layers five to seven and useful data and/or a deep look inside layers) is called "deep packet inspection". The higher the layers examined by an analysis, and the deeper the look inside the individual layers, the more powerful the hardware and software needs to be, however. Accordingly, a deeper analysis and an analysis in higher layers also become more expensive.

A firewall can analyse for example all layers and therefore detect attacks as comprehensively as possible. With the advent of Ethernet and speeds of 100 Mbit/s or, in future, even 1000 Mbit/s or up to 10 Gbit/s, data streams are no longer manageable using the previous controllers, however. Should a DoS attack take place at such a data rate, then the firewalls (or the controllers) used would be overloaded such that the control device can come to a standstill.

However, for reasons of cost, it is unimaginable that an additional firewall could be implemented on every control device. If this were to require an additional controller core in each case, then the costs of a control device would virtually erupt.

One technical problem of E/E architectures (electrical/electronic architectures: creating a structure for the vehicle in respect of the interaction and networking of the E/E systems, the interfaces, the environment, the flow of data and energy in the E/E system, the data and the software architecture, so that a continuous and vehicle-wide architecture for all E/E systems and E/E components is produced at hardware, software, vehicle electrical system, wiring harness and topology level) will be the processing of large data rates. In the event of failure, volumes of data that can no longer be managed by the firewall can arise in this case. Just because a controller has a 100-Mbit/s interface does not by a long shot mean that the software (firewall) can also process these volumes of data (in real-time). In this case, techniques are necessary in order to render the vehicle electrical system more secure without driving up costs exponentially at the same time.

SUMMARY OF THE INVENTION

An aspect of the invention is a method and an apparatus that can be used to make a vehicle network more secure with respect to external access and that can relieve the load on the firewall at the same time.

The method according to an aspect of the invention relates to a communication network for a motor vehicle, wherein a communication in the communication network involves a data transmission being performed. In this case, the communication network has provision for at least two communication subscribers. There is provision for security measures against an attack on the communication network. According to an aspect of the invention, performance of the security measures is split over multiple communication subscribers.

An attack on the communication network is intended to be understood in this context as an attack on the network to exploit security gaps. In other words, it relates to an attack by a third party (cyber attack/hacker attack) that, by means of its attack, gains access to information or control over control mechanisms/regulation mechanisms in the vehicle. In automobiles, such takeover of control by third parties can have an effect on safety, in particular of the vehicle occupants, and must therefore be avoided. This can be achieved by means of an aspect of the invention.

The security measures can be e.g. tracing and defending against particular types of attack (e.g. DoS attacks). The distribution of the performance of the security measures, e.g. such that different communication subscribers filter, or defend against, different types of attacks, advantageously provides complete coverage of, or defence against, many different possible attacks without equipping the firewall with additional hardware and/or overloading said firewall. Therefore, costs are advantageously saved. Also, defence against attacks is thus possible in real time. Further, an aspect of the invention allows the attack to be intercepted by other communication subscribers even before a harmful data packet reaches the firewall.

The distribution of the security mechanisms can be performed solely between the communication subscribers or between the communication subscribers and the firewall. By way of example, certain security measures are particularly preferably performed by the firewall, while other security measures are performed by one or more of the communication subscribers, or are split over one or more communication subscribers.

Preferably, the communication subscribers are combined to produce communication paths. The communication takes place in the communication path with the associated communication subscribers. In a further preferred development of an aspect of the invention, the distribution of the security mechanisms takes place over the communication subscribers of the respective communication path provided for the communication. The communication subscribers particularly preferably comprise at least a transmitter and a receiver between which communication in the form of a data transmission is performed. According to this development, at least one of the communication subscribers, that is to say either the transmitter or the receiver, is arranged in the automobile. The respective other communication subscriber can likewise be arranged in the automobile, or it is an external subscriber that is positioned externally. An external subscriber can be e.g. an externally arranged control device or a cloud.

In a preferred development of an aspect of the invention, the method also comprises the ascertainment of a maximum possible security assistance for each communication subscriber. Put another way, the maximum security assistance that the respective communication subscriber can provide is ascertained. The security assistance relates in this case to the assistance by the communication subscriber for performing security measures. Particularly preferably, the ascertained information is stored in a database.

The development allows the resources available for assisting the firewall to be ascertained and the distribution of the security measures to be performed accordingly. Therefore, the available resources can be utilised in optimum fashion for preventing attacks on the network.

In a preferred development of an aspect of the invention, the method comprises the ascertainment of a maximum possible search depth for each communication subscriber. The maximum possible search depth particularly preferably relates to the maximum complexity of the protocol layer in which the communication subscriber can search. In this case, the "complexity" of the protocol layer is intended to be understood such that the "complexity" increases as the number of the protocol layer increases. In layer 1 (physical layer), for example only the header and the useful data are available, the useful data being the data that are actually to be transmitted and the header containing information relating to the processing of these data by the respectively associated layer (in this case layer 1). This is the lowest, least complex layer and requires the lowest capacities (computational outlay). In layer 7, on the other hand, it is additionally necessary for six further layers to be searched, which requires a higher capacity (computational outlay). For each communication subscriber, it is therefore preferably ascertained up to which layer the communication subscriber can search the data packet.

The maximum search depth also, alternatively or additionally, relates to the depth of analysis of the individual layers, i.e. how deeply (byte depth) the individual layers are searched, that is to say how many bytes "deep" inside the respective layer it is possible to look.

This information is then preferably used to ascertain the maximum possible security assistance of the communication subscribers, since the search depth governs which attacks can be detected by the communication subscribers. This also allows an optimum distribution of resources.

In a preferred development of an aspect of the invention, the security mechanisms are in the form of filter rules, or the security mechanisms used are filter rules. Filter rules are in this case preferably rules on the basis of which it is decided what happens with a respective data packet. The filter rules are particularly preferably available as a packet filter, or network filter, and are implemented in this form in the communication subscribers and/or in a firewall.

In a preferred development of an aspect of the invention, the data transmission for the communication is performed by means of a data transmission protocol. The latter has multiple layers. Advantageously, a database having known data transmission protocols and the associated required analysis resources thereof is provided for the method. Every known data transmission protocol is therefore provided with which layers should be analysed and at what byte depth so that attacks can be reliably detected. The database is preferably used when the available resources are queried with the communication subscribers and/or when the security measures are distributed. In the case of unknown data transmission protocols, it is particularly preferably stated that the maximum resources are necessary, since in the case of unknown protocols it is unclear where attacks could be hidden. In this instance it is thus stipulated that all layers should be searched at the maximum byte depth.

In particular, the data transmission protocols are for example in the form of Ethernet, FlexRay, VLAN (Virtual Local Area Network), IP (Internet Protocol), AVB (Audio/Video Bridging), TSN (Time Sensitive Networking) or SOME/IP (Scalable service-Oriented MiddlewarE over IP).

In a further preferred development of an aspect of the invention, the communication subscribers are in the form of control devices (ECU—electronic control unit) and/or switches. Various devices in the vehicle that are present anyway are thus usable for distributing the security measures. As a result, it is not necessary to provide for further, additional hardware.

In a preferred development of an aspect of the invention, the communication network has a firewall, and the configuration of the firewall is matched to the distribution of the security measures. If security measures are undertaken by communication subscribers, the configuration of the firewall can be changed such that the firewall no longer performs these undertaken security measures. This relieves the load on the firewall. Alternatively, the firewall can also continue to perform these security mechanisms, so that there is advantageously redundancy.

The method according to an aspect of the invention is preferably carried out once at the end of production (after production of the automobile has been completed), after a software update, after the revelation of security gaps or when replacing or updating a subscriber of the communication path. Security gaps can therefore also be advantageously detected after delivery to the end customer, e.g. if control devices are replaced or if a software update has been provided. Therefore, the end customer also provides increased security against attacks during operation of the vehicle.

In a preferred development of an aspect of the invention, information relating to different attack scenarios is used for the query regarding security assistance and/or for the distribution of the security mechanisms. This information is preferably likewise stored in a database that is stored, in particular, in a memory and is not continuously updated. The information particularly preferably relates to different possible types of attack and to the required security mechanisms. One possible type of attack is e.g. DoS—Denial of Service—in which an overload is caused by a third party and results in the failure of a function or a service or else of a firewall or ECU.

In a preferred development of an aspect of the invention, the databases are stored in a secure memory area. In particular, this secure memory area is provided with encryption and is therefore protected against attacks. In this case, the secure memory area can be arranged e.g. on a central control device.

In a preferred development, the rating of the communication subscribers for their maximum possible security assistance is performed by means of an algorithm. The algorithm can preferably use the maximum possible search depth to also create resource classes and can assign the communication subscribers to the resource classes. For this purpose, the algorithm includes in particular one or more databases relating to the maximum possible search depth, the data transmission protocols and/or the information relating to different attack scenarios in the evaluation as well.

An aspect of the invention furthermore relates to an electronic monitoring unit, or control unit, for a motor vehicle control device designed to carry out the method.

An aspect of the invention can advantageously increase the security of a vehicle network, in particular without additional financial outlay. With the use of Ethernet or other data transmission systems (such as e.g. FlexRay) in automobiles, there is a need, inter alia, for mechanisms that take advantage of simple techniques and given properties of technologies in order to be able to dispense with expensive implementations and further additional hardware.

BRIEF DESCRIPTION OF THE DRAWINGS

Further preferred embodiments emerge from the following description of example embodiments on the basis of figures.

In a schematic depiction:

FIG. 5 shows an exemplary configuration of the method according to an aspect of the invention for ascertaining the maximum possible search depth, FIG. 6 shows an exemplary configuration of a database for the ascertained search depth.

In order to allow a short and simple description of the example embodiments, identical elements are provided with the same reference signs.

DETAILED DESCRIPTION OF THE PREFERRED EMBODIMENTS

Figure 1:
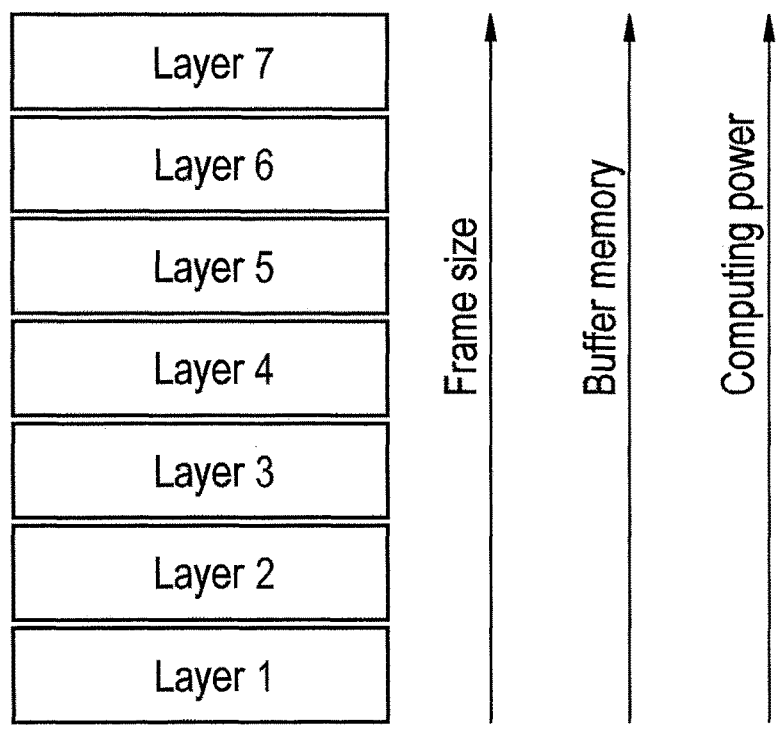
FIG. 1 shows the structure of a communication packet, or stack.

FIG. 1 shows the structure of a communication stack by way of illustration. According to the example, the communication stack can have seven layers based on the OSI model. The demands on the firewall for protecting the network are dependent on the communication layer. The higher the layer on which communication takes place, the greater the frame depth—the more memory needs to be kept and the more computing power is required. Additionally, the computed power increases as the depth of analysis in each layer increases. In this case, the depth of analysis means the byte depth used to look inside a layer.

FIG. 1 therefore shows the change in the complexity, the computing power and the memory requirement in relation to the communication layer checked. As the layer increases (number of the layer increases), the frame size of the packet increases. Thus, the buffer memory needed for buffer-storing the data during a check also increases. Similarly, the required computing power thus also increases. In order to be able to search future data packets with all layers, firewalls would need to be provided with better or additional hardware, which generates costs.

Figure 2:
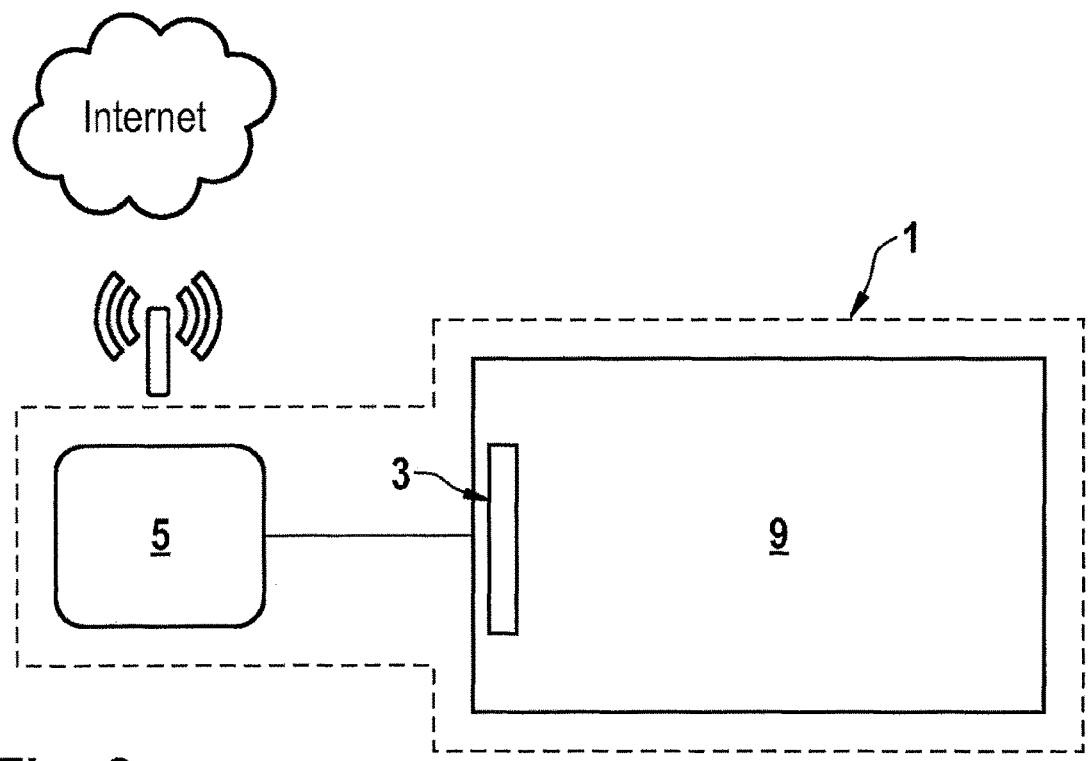
FIG. 2 shows an illustrative example of the networking of the vehicle network to the Internet via a connecting unit and a central firewall.

FIG. 2 shows an illustrative example of the networking of a vehicle network 1 to the Internet. In this case, the vehicle network 1 has a connecting unit 5 and a rest of the vehicle network 9 having a (central) firewall 3. The rest of the vehicle network can be e.g. a control device or can have multiple control devices and gateways connected to one another (not depicted) via CAN, LIN, FlexRay, MOST, LVDS, WLAN, Bluetooth or Ethernet. The network 1 is connected to the Internet via the connecting unit 5 ("connectivity unit"). According to the example, the connection between the rest of the network 9 and the connecting unit 5 is in the form of a wired connection, and the connection between the connecting unit 5 and the Internet is in the form of a wireless (radio) connection.

Figure 3:
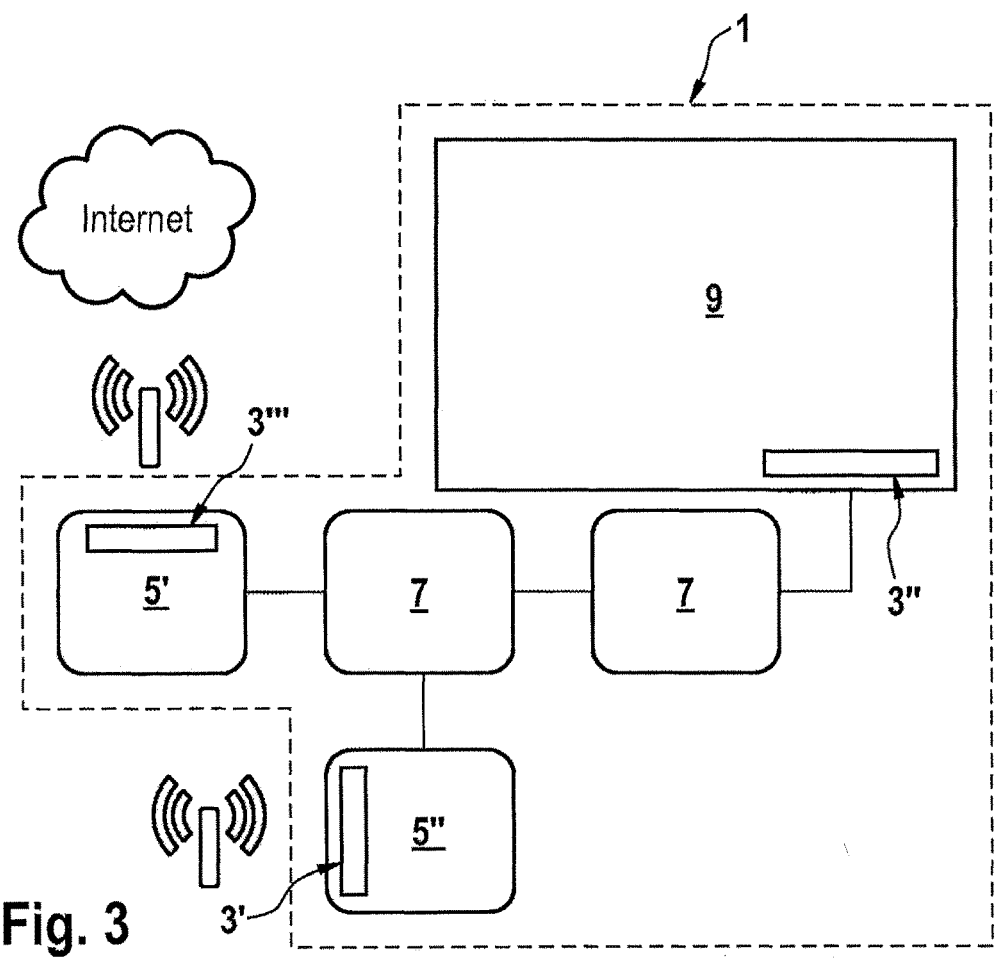
FIG. 3 shows an illustrative example of the networking of the vehicle network to the Internet via multiple connecting units and multiple central firewalls.

FIG. 3 shows a more complex variant of FIG. 2, wherein the vehicle network 1 contains multiple firewalls 3', 3" and multiple Ethernet switches 7. A connecting unit 5' and a further connecting unit 5" are likewise arranged in the vehicle network 1. Further units can be provided for in the rest of the vehicle network 9, which is depicted as a block. The rest of the vehicle network 9 and the two connecting units 5',5" each have firewalls 3',3",3''' of their own. The firewalls 3',3",3''' can be e.g. in the form of controllers configured to undertake appropriate tasks such as performing security measures.

Figure 4:
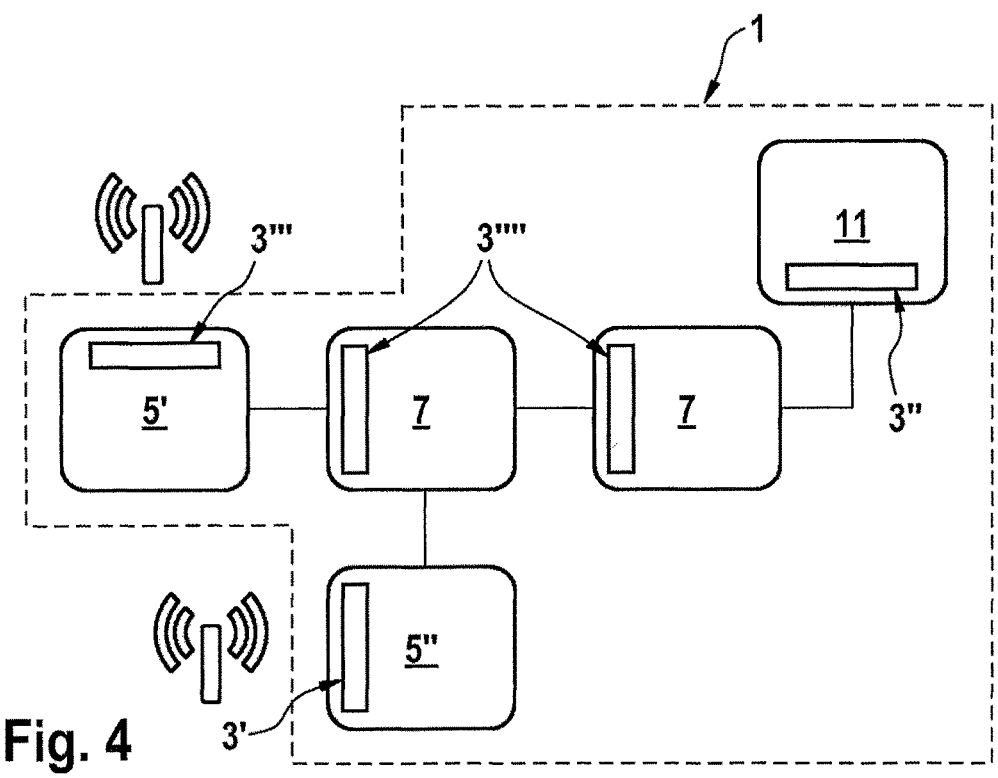
FIG. 4 shows an example embodiment of an aspect of the invention as a development for FIG. 3.

FIG. 4 shows a development of FIG. 3, wherein the rest of the vehicle network 9 is in the form of a control device (ECU) 11 with a firewall 3". The Ethernet switches 7 each additionally have a firewall 3''''. This can be provided for example by virtue of a microcontroller unit, in particular an ASIC, of the switch 7 being configured accordingly, that is to say undertaking tasks of a firewall. According to the example, the firewalls 3'''' can perform pre-sorting of the data packets, which are then filtered by the firewalls 3" and 3''' (and possibly 3') for attacks, or they can undertake some of the tasks of the firewalls 3", 3''' (and possibly 3') and thereby relieve the load on them. The firewalls 3' and 3" can be in the form of simpler and/or redundant firewalls in this case. As a result of multiple units (5", 7, 11) collaborating on the analysis and thus the computational load of the examination being distributed, it is no longer necessary for a single firewall to perform the analysis.

The individual units in the network 1 can be communication subscribers. Although the connecting unit 5" is no longer part of the primary communication path, it could also be involved in the performance of security mechanisms. After performance of the security measures, the data or results would then need to be returned to the communication path.

The performance of security measures is distributed over the communication subscribers. Not all firewalls or all communication subscribers need to undertake security measures in this case. Preferably, the distribution is effected such that there is optimum resource utilization. In particular, communication subscribers and/or firewalls can also operate as redundancy and therefore undertake security measures that can likewise be performed by another firewall or another communication subscriber. This provides a higher level of security, since errors in detecting attacks can be reduced.

FIG. 5 shows a possible method for ascertaining the maximum possible search depth of the individual communication subscribers. In this case, after the start 20 of the method, the selected communication path, or the communication requirements needed for communication and the control devices involved, is initially transmitted 22 to a selected firewall (e.g. 3-3''''). The communication requirements can comprise e.g. the message frequency, the packet type, or protocol type, and the security level. The firewall 3-3'''', or alternatively another control unit, calculates the necessary resources for the communication 24 and stores them in a communication matrix. In particular, the resources needed are categorized on the basis of the protocol type used. Known protocols and the associated resources needed can be provided as a database that can be resorted to. An external communication, for which in particular a new protocol type is used, is preferably classified such that a maximum analysis takes place. I.e. preferably all protocol layers are examined at the maximum byte analysis depth, since in the case of unknown protocols it is not clear where in the protocol it is possible for attacks to be concealed.

After ascertainment of the resources needed, a request for information is made 26, 30 to the control devices 5,5',5",7, 11. E.g. it is ascertained up to which packet layer there is the possibility 26 of assistance by the control devices 5,5',5",7, 11 and to what byte depth there is the possibility 30 of assistance. Therefore, it is ascertained what the maximum possible search depth of the control devices 5,5',5",7,11 looks like. The control devices 5,5',5",7,11 provide the firewall 3-3'''' with appropriate responses 28, 30 to the request. The ascertained information is preferably stored in a database, particularly preferably in a secure memory area, and a resource-optimised distribution of the workload is ascertained. Subsequently, the analysis can be activated 34 by the control devices 5,5',5",7,11. In this case, the control devices 5,5',5",7,11 and the firewalls 3-3'''' are configured to defend against the attacks according to the ascertained distribution.

The query by the control devices 5,5',5",7,11 regarding the assisted layers 26 can be made e.g. in steps. In this case, assistance for the first to maximum layers can be queried in succession. By way of example, it is initially queried whether the first layer is assisted. If so, it is queried whether the second layer is assisted, etc. In this case, it should be noted that a query for the first layer can be dispensed with in practice, since the first layer, as a physical base, must always be analysable. If, in the course of the step-by-step query, it is ascertained that a particular layer can no longer be analysed, it is possible to conclude from this that the initially examined layer, which has still been ascertained as assisted, is the maximum possible assisted layer. This result can then be stored for example in the database in connection with the examined control device.

FIG. 6 shows a possible matrix of a database with the ascertained information relating to the individual communication subscribers, which can be e.g. control devices 5,5',5",7,11 and/or firewalls 3-3''''. According to the example, the database can store whether the control devices 5,5',5",7,11 and the firewall 3-3'''' can identify and defend against particular attacks. Every attack takes place on a particular protocol layer. Given multiple potential types of attack, it is thus probable that different layers are affected. Every control device has a maximum possible search depth for the data protocols. While a first control device can search only on lower layers, for example, a second control device is capable of also searching on higher layers, for example. The second control device can thus cover attacks on the higher layers, and the first control device can cover attacks on the lower layers, for example. The firewall also has a maximum search depth and, when the security mechanisms are distributed over the control devices, can be configured for example such that it covers the rest of the layers that cannot be undertaken by the control devices.

Figure 7:
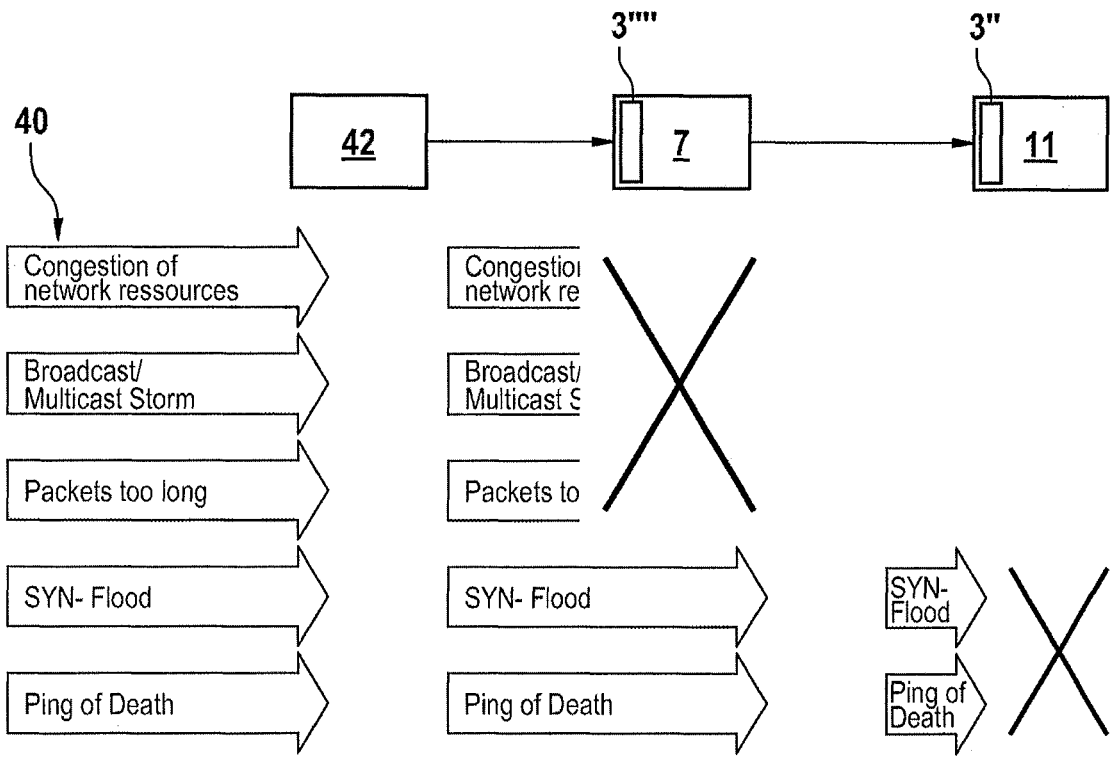
FIG. 7 shows an exemplary, configuration of the method for allocating the control devices according to security assistance.

The concept according to an aspect of the invention is also depicted in FIG. 7. The left-hand side of the figure shows the possible attacks 40, which can reach the network via an antenna 42, for example. As further communication subscribers, there is provision for a switch 7 and an ECU 11, which are supposed to receive the data packets. According to the example, the possible attacks 40 depicted are different variants of the DoS (denial of service attack), such as e.g. the "Ping of Death", a "SYN flood" or a "broadcast storm". The attacks are, according to the example, not handled by the antenna 42. A first identification of some of the attacks is undertaken by the switch 7. The attacks 40 can thus be filtered away, or filtered out, so that only the rest of the attacks 40, not undertaken by the switch 7, remain. The information, or data packets, is forwarded to the ECU 11, which undertakes the identification of the remaining attacks 40, or defends against the attacks 40. The identification of, or defence against, the attacks 40 can be referred to as a security measure. The security measures for avoiding attacks 40 on the network 1 are therefore performed in distributed fashion in the network 1. For that purpose, analysis of the available resources (e.g. by switch 7 and ECU 11) is followed by allocation of the security measures being performed. Advantageously, a large bandwidth of attacks 40 can thus be defended against without new hardware needing to be provided that needs to detect all attacks 40. The distribution of the performance of the security measures therefore allows costs to be saved.

Figure 8:
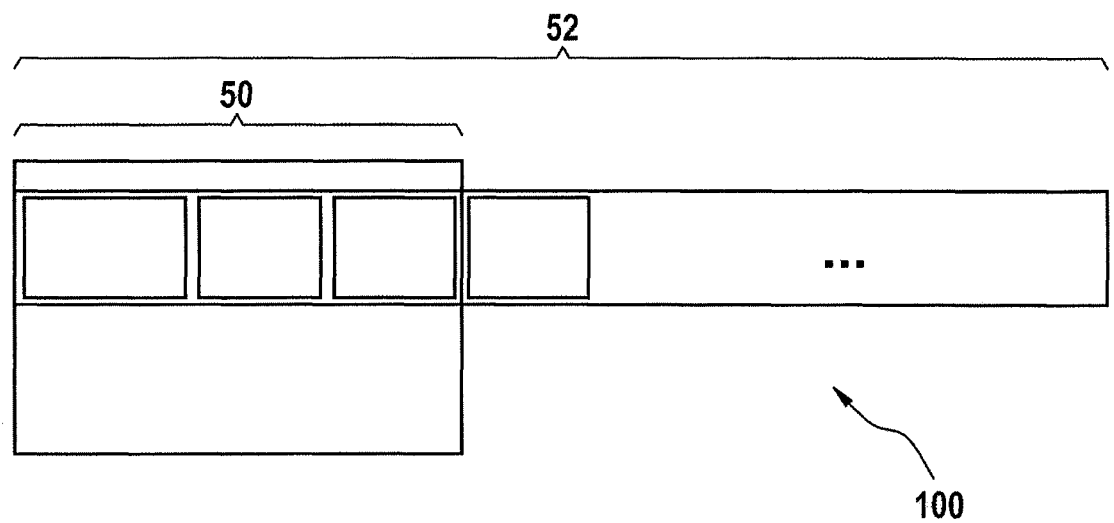
FIG. 8 shows a comparison of the search depth of an Ethernet switch and a firewall.
Figure 9:
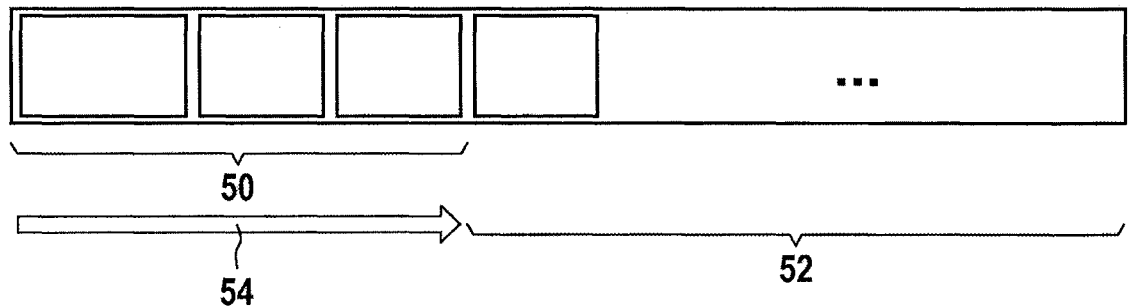
FIG. 9 shows an exemplary embodiment of the method for distributing the search depth.

FIG. 8 shows, in exemplary fashion, a data packet used to depict the search depth of an Ethernet switch 7 and a firewall 3-3''''. The different boxes are the headers and the useful data. While the Ethernet switch 7 can search 50 only the data (box on far left) and the first two headers/layers, it is possible for the firewall 3-3'''' to search 52 all layers of the data packet—with e.g. seven layers. If switch 7 and firewall 3-3'''' were both to start the search, there would therefore be a redundancy in the region of the first two layers 50. This redundancy can either be used for error analysis by comparing the results from the switch 7 and the firewall 3-3'''' in this region, or the firewall 3-3'''' searches only the headers that cannot be searched by the switch 7 (FIG. 9). In the latter case, a shift 54 in the analysis regions thus takes place for the firewall 3-3''''. It accordingly no longer needs to search the layers that can also be analysed by the switch 7. In that case, the firewall 3-3'''' advantageously has resources available for further tasks. The regions to be analysed can naturally likewise be split over further switches 7 or control devices 11, so that the share for the firewall 3-3'''' becomes even smaller.

Figure 10:
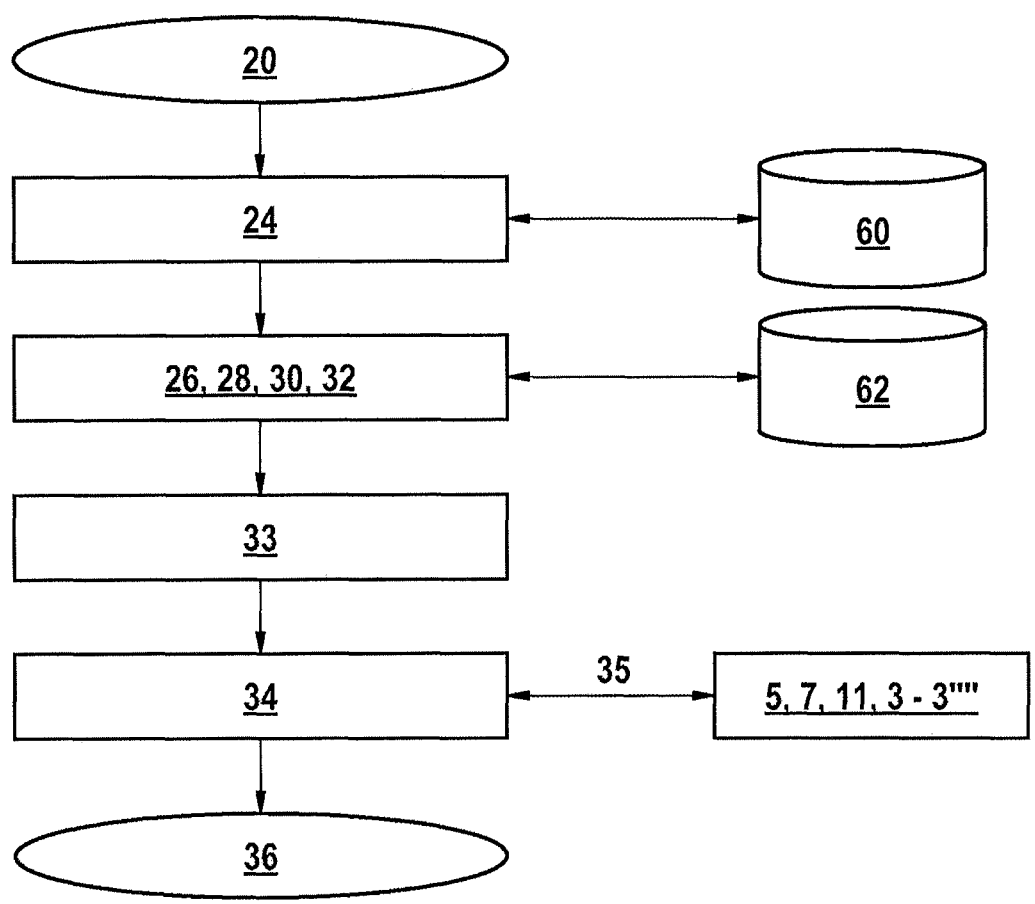
FIG. 10 shows an exemplary sequence for the distribution of the security mechanisms.

FIG. 10 shows an alternative depiction of the overall view of the method shown in FIG. 5 for distributing the security measures when a particular data transmission protocol is used. After the start of the method 20, the necessary analysis resources are ascertained 22, e.g. by a control unit or firewall, which are then stored in a communication matrix. It is then ascertained which layers and what depth of analysis the control units or firewalls can provide. The result is stored in a security database 62. Subsequently, it is determined how the distribution of the security measures is meant to take place 33. Thereafter, the ascertained distribution can be implemented in practice, to which end the control units and firewalls are configured 34 accordingly. For this purpose, communication with the control units and firewalls is effected 35. The matched configurations are used to successfully spot and block 36 attacks in a distributed manner.

Further information concerning an aspect of the invention:

An aspect of the invention proposes a novel method in order to distribute and divulge filter rules (a basic principle of a firewall) in the network. Furthermore, an aspect of the invention provides methods in order to query the automotive network and the components thereof regarding said rules and to configure them according to said rules. In this case, an aspect of the invention defines mechanisms in order to select the correct security platform for potential attack functions in good time; in this regard, see FIG. 5 for an illustrative example.

An aspect of the invention proposes a method that configures the security capabilities and options, and renders them usable, in the network via an interface. It therefore becomes evident which security mechanisms can be covered repeatedly, which ones cannot be covered at all and which ones can be dispensed with. A security matrix obtained in this manner allows a simple depiction of firstly what type of security can be implemented and secondly also the level of security providable by means of the respective control devices. The methods of an aspect of the invention clarify for the first time how the firewall can be relieved of load and to where computing power can be relocated.

This method allows the entire network to be checked and tested in respect of security (attacks from outside) much more easily.

An aspect of the invention proposes using the Ethernet TSN standard and in this case specifically the IEEE802.1Qci Ingress Policing and Filtering substandard for the purpose of vehicle security. The standard and the capabilities thereof can become critically important for the automotive sector, since firstly these functions are implemented in hardware, and therefore require no computing power in the software, and secondly such components will probably be included in every future automobile.

The essence and novelty of an aspect of the invention is that firstly the security of the vehicle network is increased (for the same costs) and secondly a redundancy is provided for security mechanisms. With the advent of Ethernet, there is also a need, inter alia, for mechanisms that take advantage of simple techniques and given properties of technologies in order to be able to dispense with expensive implementations and further additional hardware.

An aspect of the invention has the advantage that the new technologies such as Ethernet or IP can be managed better. The new technologies must no longer be held up in automobiles. Typical techniques from IT cannot all be undertaken. For example, the encryption cannot be of finite depth (128 bits), since the necessary computing time is typically in the range of seconds. In this instance, the demands in automobiles cannot be met.

In the event of an error on a CAN or LIN, the controllers (incl. firewall) are admittedly able at present to manage the flood of packets if they operate at 100%. With a 100 Mbit/s Ethernet or even a 1000 Mbit/s Ethernet, this is no longer possible (regardless of whether the controllers have such an interface). The firewall can operate assuredly as a result of an aspect of the invention and is not subjected to overload.

The hardware demands on the firewall therefore do not have to be raised. Additional controllers can thus be dispensed with if adherence to the security performance remains constant. This results in a cost saving as a result of reduction of the necessary computing power of the firewall.

The distribution of the security mechanisms and redundant execution or computation of some mechanisms also allow simple errors to be avoided. The repeated integration of the security functions in the vehicle electrical system thus allows an attack/error to be detected ahead of the actual firewall, and countermeasures to be initiated more quickly.

This indicates that no component alone can manage security in a vehicle electrical system (in consideration of reasonable overall costs). Although a firewall can cover almost everything in principle, it needs a very high level of performance as a result in order to do this in real time. A switch can cover many of these functions on a lower layer already and can manage without additional components such as memory or CPUs as a result of its built-in HW-assisting methods. The assistance achieved for the system to this end not only makes the overall concept more redundant and more secure but also makes the complexity of the firewall(s) simpler.

Following transmission of the communication path (dynamically in the system, on implementation of the firewall using the DBC, Fibex files, or on end-of-production programming), the firewall calculates the necessary resources for protecting the incoming messages. Packet type, packet length, protocol and message frequency directly influence the computing capacity and memory required therefor. Even today, a single CPU is provided only for deep packet inspection. An aspect of the invention proposes that the firewall relocates security mechanisms in the network or provides them redundantly. To this end, during system design, updates or during implementation, the Ethernet switches are queried about their functions using a service discovery method. The aim of the query is insight into the relocation of the deep packet inspection, which requires a high level of computing power and can already be relocated in part.

The various attack techniques are thus advantageously not first stopped by the firewall, but rather can already be eliminated in part by the control devices ahead of the actual firewall and the receiver. Following categorisation of the security assistance, the system (the firewall) is able to protect the communication path(s) and to allocate the security mechanisms.

A further option provided by an aspect of the invention is optimization of the firewall. Detection of the search depth of the ECUs or switches allows the firewall to use the computing power for other examinations and thereby to perform realtime examinations. Since it is no longer necessary for the entire frame to be searched, this saves memory and computing power.

The invention claimed is:

1. A method for a communication network in a motor vehicle, wherein a communication in the communication network involves a data transmission being performed and the communication network has provision for at least two communication subscribers, the method comprising:
   determining, by a first one of the at least two communication subscribers, resources required for executing a security analysis for securing the communication against attacks on multiple protocol layers of the communication;
   determining, by the first one of the at least two communication subscribers, first security capabilities of the first one of the at least two communication subscribers to secure the communication against the attacks, and second security capabilities of a second one of the at least two communication subscribers to secure the communication against the attacks;
   distributing, by the first one of the at least two communication subscribers, based on the first security capabilities, a first task within the security analysis to the first one of the at least two communication subscribers such that the first one of the at least two communication subscribers protects against the attacks on the first of the protocol layers; and
   distributing, by the second one of the at least two communication subscribers, based on the second security capabilities, a second task within the security analysis to the second one of the at least two communication subscribers such that the second one of the at least two communication subscribers protects against the attacks on the second of the protocol layers.

2. The method as claimed in claim 1, the method further comprising:
   ascertaining a maximum possible security assistance for each of the at least two communication subscribers, wherein
   the distribution of the first task and the second task is performed based on the maximum possible security assistances of the at least two communication subscribers.

3. The method as claimed in claim 2, the method further comprising:
   ascertaining the maximum possible search depth of the at least two communication subscribers, wherein
   the maximum possible search depth is used for ascertaining the maximum possible security assistance of the at least two communication subscribers.

4. The method as claimed in claim 3, wherein the communication is performed by a data transmission protocol that has multiple layers, wherein for the maximum possible search depth the maximum layer analysable by a respective communication subscriber of the at least two communication subscribers and/or the maximum byte depth, of each layer, analysable by the respective communication subscriber of the at least two communication subscribers is ascertained.

5. The method as claimed in claim 1, wherein the first task and the second task include filter rules.

6. The method as claimed in claim 1, wherein the at least two communication subscribers provided for are at least one control device and/or at least one switch.

7. The method as claimed in claim 1, wherein the communication network has at least one firewall for defending against the attacks on the communication network, the method further comprising:
   matching the configuration of the firewall to the distribution of the first task and the second task.

8. The method as claimed in claim 1, wherein the method is carried out once at the end of production, after a software update, after the revelation of security gaps or when replacing or updating the at least two communication subscribers.

9. An electronic monitoring unit for a motor vehicle control device, wherein the motor vehicle control device is designed to carry out the method as claimed in claim 1.

* * * * *